J. T. SEWELL.
ODORLESS COOKER.
APPLICATION FILED OCT. 11, 1911.
1,094,936.
Patented Apr. 28, 1914.
3 SHEETS—SHEET 1.
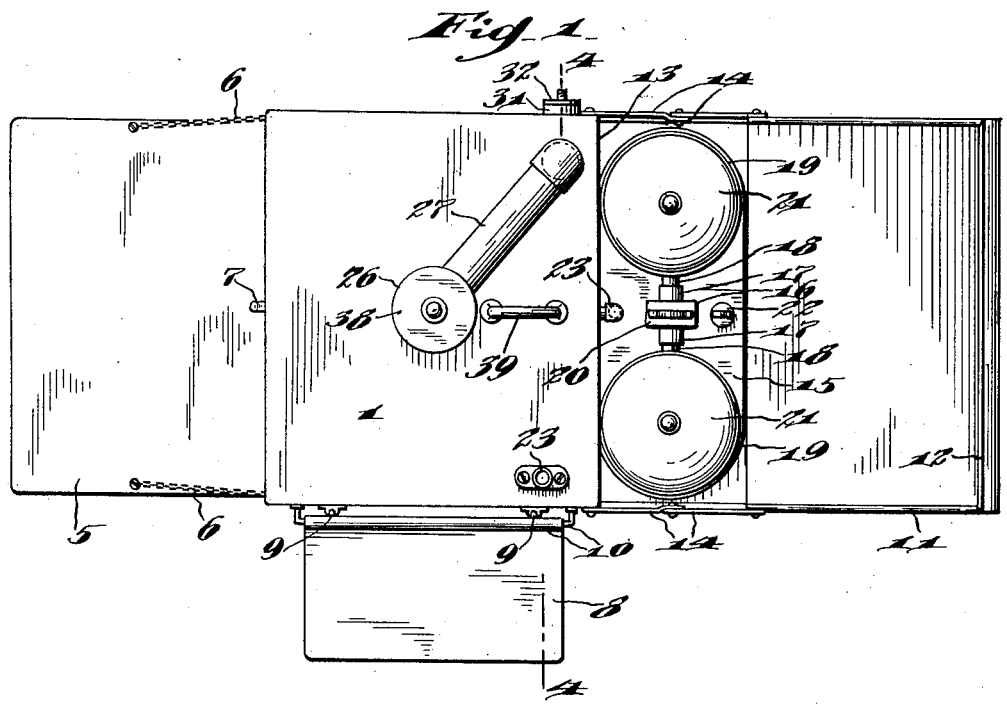
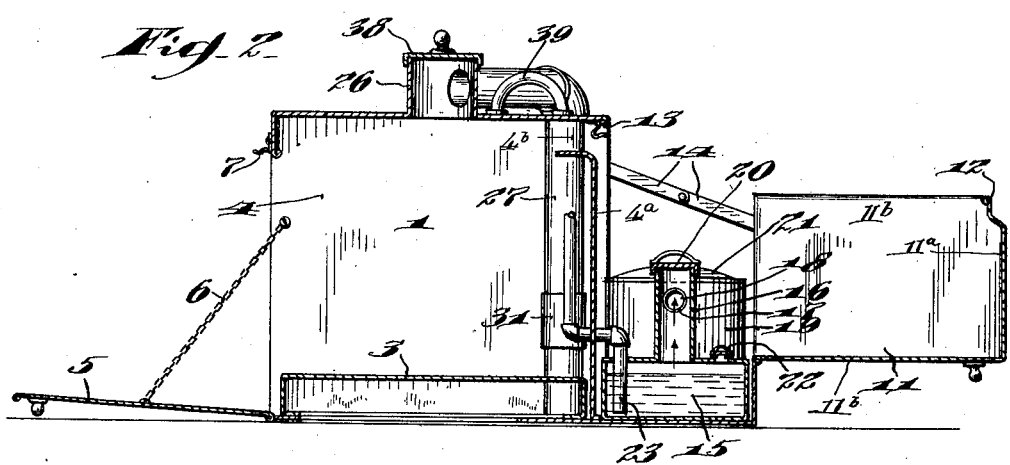
WITNESSES:
INVENTOR
John T. Sewell,
BY Joshua R. H. Potts
Attorney

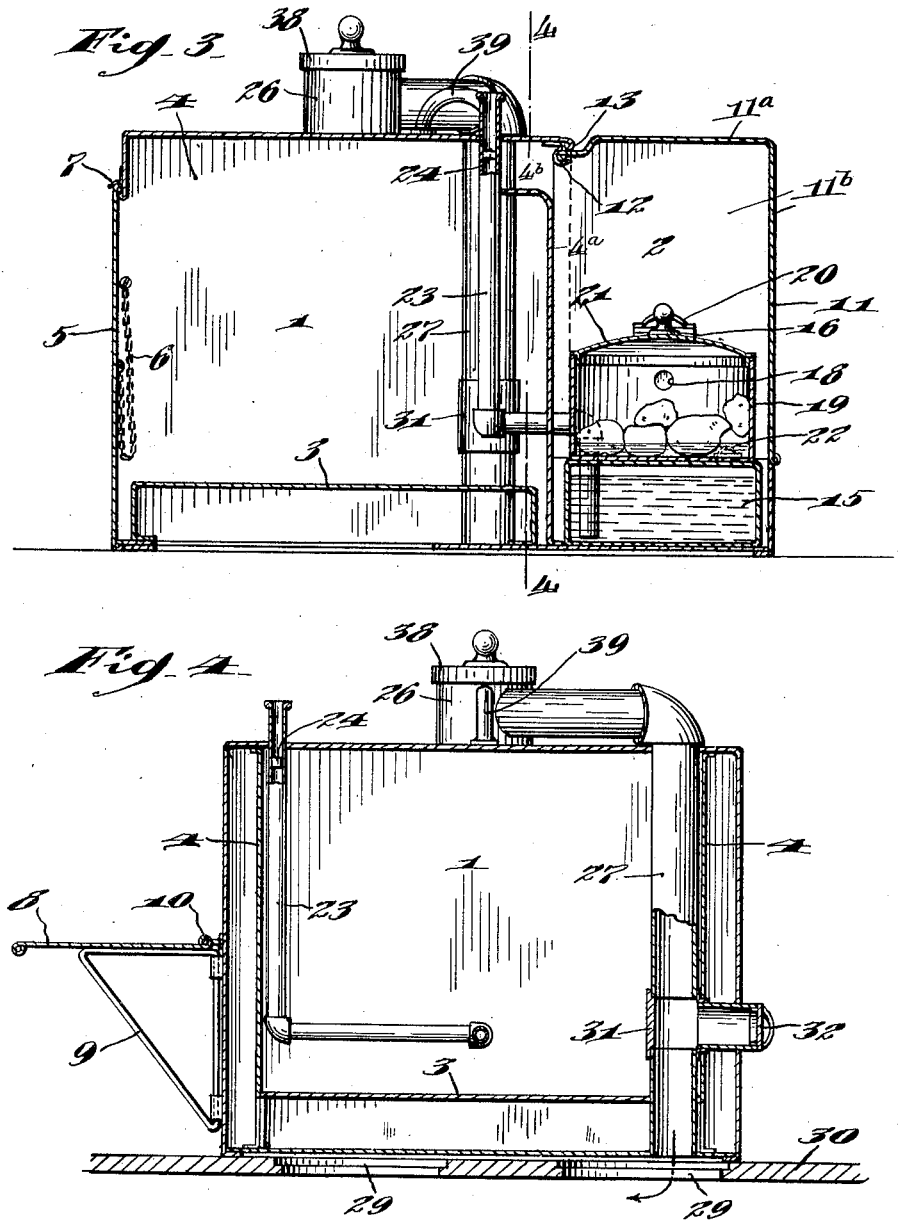

J. T. SEWELL.
ODORLESS COOKER.
APPLICATION FILED OCT. 11, 1911.

1,094,936.

Patented Apr. 28, 1914.

3 SHEETS—SHEET 3.

WITNESSES:

INVENTOR
John T. Sewell,
BY
Joshua R. H. Potts.
Attorney

UNITED STATES PATENT OFFICE.

JOHN T. SEWELL, OF PHILADELPHIA, PENNSYLVANIA.

ODORLESS COOKER.

1,094,936.　　　　　　　Specification of Letters Patent.　　Patented Apr. 28, 1914.

Application filed October 11, 1911. Serial No. 654,110.

*To all whom it may concern:*

Be it known that I, JOHN T. SEWELL, a citizen of the United States, residing at Philadelphia, in the county of Philadelphia and State of Pennsylvania, have invented certain new and useful Improvements in Odorless Cookers, of which the following is a specification.

My invention relates to improvements in odorless cookers, the object of the invention being to provide a cooker of this character which embodies different compartments in which baking and steaming may be accomplished without any mixing of the odors.
A further object is to provide a cooker of this character with improved means for carrying off the odors of the cooking, either directing the same into the stove or out of the window.
A further object is to provide a cooker of this character which economizes space, and which permits ready access to the different utensils during the cooking operation.

A further object is to provide a cooker of this character with an improved boiler which directs steam into cooking receptacles.

With these and other objects in view, the invention consists in certain novel features of construction and combinations and arrangements of parts, as will be more fully hereinafter described and pointed out in the claim.

Figure 5:
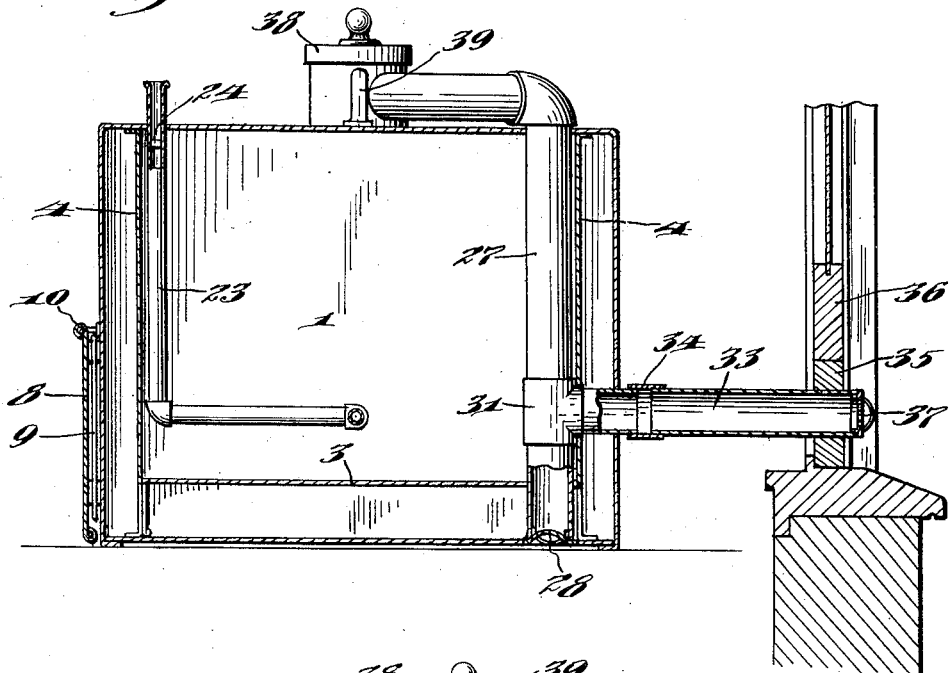
Figure 6:
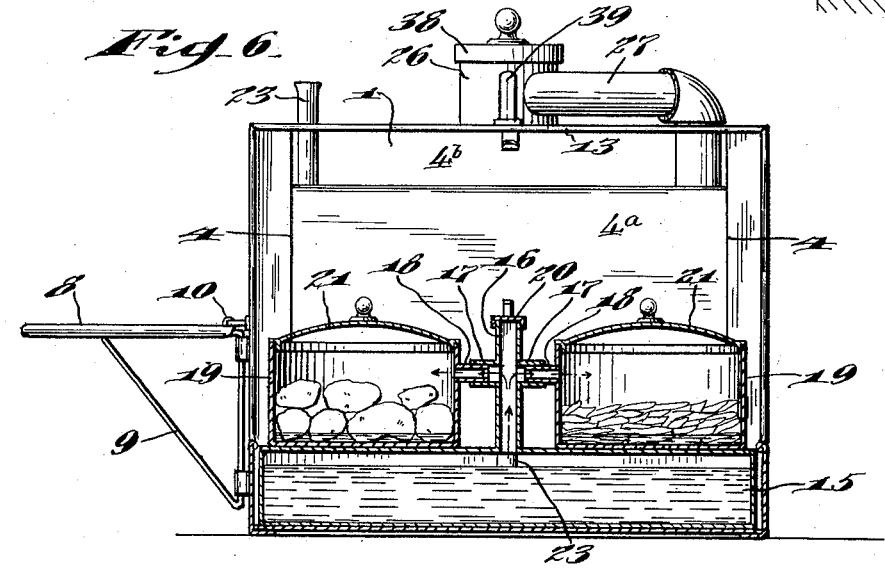

In the accompanying drawings: Figure 1, is a plan view showing my improved cooker in open position. Fig. 2, is a view in longitudinal section through the center of Fig. 1. Fig. 3, is a view in longitudinal section showing the cooker in closed position. Fig. 4, is a view in section on substantially the line 4—4 of Fig. 1, portions of the vent and alarm pipes being shown in elevation. Fig. 5, is a view similar to Fig. 4, but showing my improved attachment for conveying the odors out of a window, and Fig. 6, is a view in transverse section through the boiler and coöperating parts.

My improved cooker is constructed of sheet metal, and provided with suitable lining and air tight stripping of asbestos or other suitable material wherever found necessary to prevent the exchange of temperatures, and to keep the compartment tight. I have not illustrated this asbestos lining or stripping for purposes of clearness in the drawings. The cooker comprises two chambers an oven 1 and a steamer 2. Both of these compartments are preferably rectangular in form, the former being preferably larger than the latter and having a raised bottom 3 and spaced side walls 4 to allow the heat to freely circulate about the oven. The compartments are formed with integral side walls and are separated by a vertical partition wall 4ª having an aperture or communicating opening 4ᵇ at or adjacent its upper end.

A hinged door 5 is provided for the oven, and its opening movement is limited by chains 6 as clearly shown. This door is held in normal closed position by fasteners 7 and a supporting tray 8 is preferably provided at one side of the oven, and may be in horizontal position as shown in Fig. 4, when swinging brackets 9 are projected outwardly. This tray or platform is hinged as shown at 10, so that the brackets and the platform may be swung against the side of the oven and occupy but relatively small space. Arranged in the bottom of the steamer 2 is a boiler 15, and the fixed side walls of the steamer extend upwardly to about the level of the top of the boiler, as shown clearly in Figs. 2 and 3. The steamer 2 is open at the top and is provided with a hinged cover 11 which is shaped at its edges as shown at 12 to snugly fit into the adjacent edges 13 of the oven wall and form therewith a tight juncture. The cover 11 comprises a top portion 11ª and three vertical walls 11ᵇ forming a rectangular casing, constituting the upper portion of the steamer chamber 2. The opening movement of this cover is limited by hinged links 14, and when in open position, the door acts as a support for the cooking utensils.

The boiler 15 is provided with a vertical tube 16 at its center. This tube 16 is provided with laterally projecting branches 17, which telescope on nipples 18 on cooking receptacles 19. The upper end of the tube 16 is normally closed by a cap 20, and the receptacles 19 have covers 21 thereon. A plug 22 is provided to close the inlet for water to said boiler, and an outlet pipe 23 is provided which extends to a point near the bottom of the boiler, and out through the top of the oven. A check valve 24 is provided in this pipe so as to allow the passage of steam in one direction only. The check valve is shown diagrammatically, or rather its casing is shown, the valve being hid by the casing. The pipe 23 extends close to the bottom of the boiler 15, and is normally closed by the water of the boiler. When, however, the water gets low, steam will find its way through said pipe and the cook will thereby be notified that it is necessary to place water in the boiler.

A dome 26 is provided on top of the oven 1, and with this dome a relatively large pipe 27 communicates, and extends down to the open bottom of the oven. This open end of the tube is normally closed by a plug 28, but this plug is removed when the oven is over an ordinary coal stove, so that the odors may pass down through the coal opening 29 in the stove 30, when the lid is removed. Between the ends of the pipe 27, a T 31 is provided, and this T is closed by a plug 32 when the device is used on a coal stove as above explained. When used on a gas stove, the plug 32 is removed and the plug 28 is in position. The T 31 is then connected by a coupling 34 with a pipe 33, the latter extending through a bar 35 under a window sash 36. A perforated cap 37 is located in the end of this pipe to exclude insects. To facilitate the cleaning out of the several parts, the dome 26 is preferably provided with a removable cover 38, which when removed, permits access to the upper part of the oven, as well as the odor pipe. A handle 39 is provided on top of the oven, and this handle is preferably of wood or some other non-conducting material to permit the devices to be readily moved.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A cooker adapted to be arranged upon a stove and comprising a casing, a vertical partition dividing said casing into two compartments, there being a communicating opening at or adjacent the upper end of said partition, each of said compartments being provided with an opening giving access thereto, closures for said openings, a dome in the top of one of said compartments, a ventilating pipe leading from said dome, and a boiler arranged in the bottom of the other compartment and having radiating walls whereby the heat and vapors generated in said compartment may pass through said communicating opening into the other compartment and both compartments be ventilated by said ventilating pipe, substantially as described.

In testimony whereof I have signed my name to this specification in the presence of two subscribing witnesses.

JOHN T. SEWELL.

Witnesses:
R. H. KRENKEL,
CHARLES E. POTTS.

---

Copies of this patent may be obtained for five cents each, by addressing the "Commissioner of Patents, Washington, D. C."